US009745455B2

United States Patent
Paulino et al.

(10) Patent No.: US 9,745,455 B2
(45) Date of Patent: Aug. 29, 2017

(54) BIAXIALLY ORIENTED MATTE POLYPROPYLENE FILM

(71) Applicant: TORAY PLASTICS (AMERICA), INC., North Kingstown, RI (US)

(72) Inventors: Claudio M. Paulino, South Kingstown, RI (US); Keunsuk P. Chang, North Kingstown, RI (US); Christopher D. Roy, Saunderstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 1065 days.

(21) Appl. No.: 13/956,154

(22) Filed: Jul. 31, 2013

(65) Prior Publication Data

US 2015/0037556 A1 Feb. 5, 2015

(51) Int. Cl.
| | |
|---|---|
| *B32B 7/02* | (2006.01) |
| *B32B 27/32* | (2006.01) |
| *C08L 23/12* | (2006.01) |
| *C08L 23/06* | (2006.01) |
| *B32B 27/08* | (2006.01) |

(52) U.S. Cl.
CPC .............. *C08L 23/12* (2013.01); *B32B 7/02* (2013.01); *B32B 27/08* (2013.01); *B32B 27/32* (2013.01); *B32B 2270/00* (2013.01); *B32B 2307/406* (2013.01); *B32B 2307/408* (2013.01); *B32B 2307/518* (2013.01); *B32B 2307/702* (2013.01); *B32B 2307/704* (2013.01); *B32B 2551/00* (2013.01); *Y10T 428/31692* (2015.04); *Y10T 428/31913* (2015.04)

(58) Field of Classification Search
CPC .......... C08L 23/12; C08L 23/06; B32B 27/32; B32B 7/02; Y10T 428/31692; Y10T 428/31913
See application file for complete search history.

(56) References Cited

U.S. PATENT DOCUMENTS

| 6,407,171 B1 * | 6/2002 | Agarwal | C08L 23/06 525/191 |
|---|---|---|---|
| 2004/0115457 A1 * | 6/2004 | Kong | B32B 7/06 428/515 |

FOREIGN PATENT DOCUMENTS

JP 10086299 A * 4/1998

OTHER PUBLICATIONS

"What are the differences between HDPE, LDPE, XLPE, LLDPE, and UHMWPE?". http://www.usplastic.com/knowledgebase/article.aspx?contentkey=508, (2008).*
Machine Translation of JP10-086299. Retrieved Apr. 5, 2017.*

* cited by examiner

*Primary Examiner* — Prashant J Khatri
(74) *Attorney, Agent, or Firm* — Pillsbury Winthrop Shaw Pittman LLP

(57) ABSTRACT

A multi-layer biaxially oriented polypropylene (BOPP) film with a novel formulation which exhibits matte appearance is disclosed. This improved formulation comprises a blend of high density polyethylene (HDPE), medium density polyethylene (MDPE), low density polyethylene (LDPE) or linear low density polyethylene (LLDPE) with polypropylene (PP) used in the core layer to achieve a matte appearance low gloss PP-based film that still exhibits typical properties of BOPP films with significantly lower haze than conventional matte films. The multi-layer BOPP film has additional layers such as a second polyolefin resin-containing layer, a metal layer, or combinations thereof.

21 Claims, No Drawings

BIAXIALLY ORIENTED MATTE POLYPROPYLENE FILM

FIELD OF INVENTION

This invention relates to a multi-layer biaxially oriented polypropylene (BOPP) film with a novel formulation which exhibits matte appearance, i.e., a dull and flat appearance with low gloss. This improved formulation comprises a blend of high density polyethylene (HDPE), medium density polyethylene (MDPE), low density polyethylene (LDPE) or linear low density polyethylene (LLDPE) with polypropylene (PP) used in the core layer to achieve a matte PP-based film that still exhibits typical properties of BOPP films with lower haze than conventional matte films.

BACKGROUND OF INVENTION

Biaxially oriented polypropylene (BOPP) films used for packaging, decorative, and label applications often perform multiple functions. It must perform in a lamination to provide printability, transparent or matte appearance, or slip properties; it sometimes must provide a surface suitable for receiving organic or inorganic coatings for gas and moisture barrier properties; it sometimes must provide a heat sealable layer for bag forming and sealing, or a layer that is suitable for receiving an adhesive either by coating or laminating.

Matte appearance can be achieved by addition of organic or inorganic particles, but these processes usually affect the clarity and transparency of the BOPP films and also add cost to the manufacturing process, and are not suitable for certain packaging applications for aesthetic reasons for they negatively impact the visual appeal of the printed job. Another way to obtain matte appearance in BOPP films is to coat the surface layer, but this option is also usually undesirable because these coatings are expensive and also negatively impact the visual appeal of the printed job, and in order to be effective they need to be used at a level that imparts significant cost to the BOPP film. All these processes also increase the coefficient of friction of the matte surface of the film, which is undesirable because it can limit the operational speed of the converting processes, which in turn decreases productivity.

In addition, most matte appearance BOPP films in the current marketplace exhibit not only low gloss, but also very high haze. While the low gloss is desirable for the aesthetic appearance of a matte-looking package, the high haze can cause a loss of graphic clarity or "pop." The high haze of conventional BOPP matte films can mute or "wash-out" or lessen the color saturation of many printing inks used for the packaging graphics. Often, the color palette or color choices can be limited by the use of conventional matte films due to this loss of color saturation.

U.S. Pat. No. 8,431,234 B2 describes a heat sealable matte film formulation using a matte resin formulation of 15-30 wt % metallocene-catalyzed butene-propylene elastomer and 85-70 wt % of a matte resin including ethylene homopolymer and propylene homopolymer or copolymer. However, the film has a high haze >60%.

U.S. Pat. No. 5,474,820 A describes several multilayer polypropylene matte film formulations of polypropylene homopolymer and copolymers, ethylene, propylene, butylenes and other α-olefin having 5 to 10 carbon atoms and HDPE. However, the film has a high haze >30%.

EP Patent 0538746 B1 describes a matte film formulation using a matte resin formulation of 20-80 wt % HDPE and propylene homopolymer. However, the film has a high haze of >40%.

There remains a need in the art for new and improved methods for making matte films with new and improved optical properties. The inventors have found a solution that balances the attributes of matte appearance and low haze by adding an amount from 1-90 wt % of high density polyethylene (HDPE), medium density polyethylene (MDPE), low density polyethylene (LDPE) or linear low density polyethylene (LLDPE) to polypropylene (PP).

SUMMARY OF THE INVENTION

It is the objective of this invention to provide a method for achieving matte appearance of a BOPP film using a blend of high density polyethylene (HDPE), medium density polyethylene (MDPE), low density polyethylene (LDPE) or linear low density polyethylene (LLDPE) and polypropylene (PP) resins without sacrificing optical properties such as transparency and clarity of the film, coefficient of friction and other desirable mechanical properties. This inventive film can provide a suitable and attractive low gloss, matte appearance, a low haze of below 30 and better clarity than conventional matte OPP films, thus allowing a wider choice in printing ink color palette and retention of color saturation.

One embodiment is a laminate film comprising a core layer of a resin blend comprised of propylene homopolymer and high density polyethylene or medium density polyethylene or low density polyethylene or linear low density polyethylene. This core or base layer not only provides the bulk strength of the laminate film, but also imparts a matte looking effect on the adjacent layers of the laminate. The laminate further comprises a second polyolefin resin-containing layer on one side of said core layer. This second polyolefin resin-containing layer could be considered a sealable layer of this laminate and is comprised of either a propylene copolymer or a propylene terpolymer. In another embodiment this second polyolefin resin-containing layer is comprised of either a propylene copolymer or a propylene terpolymer combined with a propylene ethylene elastomer. In yet another embodiment this second polyolefin resin-containing layer comprises a polyolefin selected from the group consisting of propylene homopolymer, copolymers, terpolymers and combinations thereof. Furthermore, the laminate could further comprise a third polyolefin resin-containing layer on the second polyolefin resin-containing core layer opposite the side with the sealable layer.

Preferably, the third polyolefin resin-containing layer comprises a polyolefin selected from the group consisting of propylene homopolymer, copolymers, terpolymers and combinations thereof. This third polyolefin resin-containing layer can also comprise an antiblock component selected from the group consisting of amorphous silicas, aluminosilicates, sodium calcium aluminum silicates, crosslinked silicone polymers, and polymethylmethacrylates to aid in machinability and winding. Preferably, the third polyolefin layer is a discharge-treated layer having a surface for lamination, metallizing, printing, or coating with adhesives or inks.

In the case of a film structure comprising only one layer, such as said core layer, it is preferable to discharge-treat one side of this layer for lamination, metallizing, printing, or coating, while leaving the opposite side treated or untreated as desired. In the case of a 2-layer laminate structure wherein a sealable layer is contiguous with the polyethylene/ polypropylene blended (PE/PP) core layer, it is preferable to discharge-treat the side of the core layer opposite the sealable layer for purposes of laminating, printing, metallizing, coating, etc.

In the case of a film structure comprising three layers, such as said third polyolefin layer on one side of the blended PE/PP core layer, it is preferable to discharge-treat the side of this third layer opposite the core layer for lamination, metallizing, printing, or coating etc.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further comprise a vacuum-deposited metal layer on the discharge-treated layer's surface. Preferably, the metal layer has a thickness of about 5 to 100 nm, has an optical density of about 1.5 to 5.0, and comprises aluminum. In one variation, the laminate film is an extruded laminate film.

Preferably, the laminate film is produced via coextrusion of the sealable layer blend and the blended PE/PP core layer and/or other layers through a compositing die whereupon the molten multilayer film structure is quenched upon a chilled casting roll system or casting roll and water bath system and subsequently oriented in the machine and transverse direction into a multi-layer film.

All these examples can also be metallized via vapor-deposition, preferably a vapor-deposited aluminum layer, with an optical density of at least about 1.5, preferably with an optical density of about 2.0 to 4.0, and even more preferably between 2.3 and 3.2.

Optionally, an additional layer specifically formulated for metallizing to provide adequate metal adhesion and gas barrier properties can be disposed on the second polyolefin resin-containing core substrate layer, opposite the side with the sealable blend layer. Additionally, this additional layer's surface may also be modified with a discharge treatment to make it suitable for metallizing, laminating, printing, or converter applied adhesives or other coatings.

Optionally, a matte resin can be added to one of the skin layers to further enhance the matte appearance of the film, preferably at a lower amount than that used in traditional matte films so that a low haze level is maintained.

This invention provides a method that utilizes high density polyethylene, medium density polyethylene, low density polyethylene or linear low density polyethylene blended with polypropylene in the core layer of the film that allows good clarity and transparency, maintains good mechanical properties and low coefficient of friction, and is a lower cost option than organic or inorganic particles and expensive coatings generally used to achieve matte appearance of biaxially oriented polypropylene films. The invention helps solve the high haze problems associated with the prior art of matte polyolefin substrates in packaging applications.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

In one embodiment of the invention, the laminate film comprises a 2-layer coextruded film of: a mixed polyolefin resin core layer (B) comprising a resin blend of crystalline propylene and HDPE, MDPE, LDPE or LLDPE, the amount of each type of PE used is from about 1% to about 90% of the total weight of the core layer, a preferred amount was about 5 wt % to 30 wt % PE in the core layer; a propylene copolymer or a propylene terpolymer sealable layer (C) disposed on one side of the said mixed resin layer; and the side of the core layer opposite the propylene copolymer or propylene terpolymer sealable layer is discharge-treated.

Another embodiment of the inventive laminate film comprises a similar construction as above, except that the polyolefin resin sealable layer (C) comprises either a propylene copolymer or a propylene terpolymer combined with a propylene ethylene elastomer. In yet another embodiment this second polyolefin resin-containing layer (C) comprises a polyolefin selected from the group consisting of propylene homopolymer, copolymers, terpolymers and combinations thereof, suitable for metalizing, printing, coating, lamination etc.

The polypropylene resin in the core layer (B) is a crystalline polypropylene of a specific isotactic content and can be biaxially oriented. The crystalline polypropylene can be a propylene homopolymer or a mini-random ethylene-propylene copolymer with a fractional ethylene content of less than 1 wt % of the polymer (preferably about 0.5-0.6 wt %). Crystalline polypropylenes are generally described as having an isotactic content of about 90% or greater. Suitable examples of crystalline polypropylenes for this invention are Total 3271 and Conoco Phillips PP CH020XK. These resins also have melt flow rates of about 1.6-2.0 g/10 min, a melting point of about 157.3° C., a crystallization temperature of about 108-126° C., a heat of fusion of about 98.2 J/g, a heat of crystallization of about 105-111 J/g, a $C^{13}$ NMR isotactic pentad ratio of about 93%, a % heptane insolubles of about 95-96%, and a density of about 0.90-0.91. The core resin layer (B) is typically 8 μm to 100 μm in thickness after biaxial orientation, preferably between 10 μm and 50 μm, and more preferably between 15 μm and 30 μm in thickness. A preferred embodiment is to use high crystalline propylene homopolymer such as Total 3270 to provide a higher modulus film and consequently, a stiffer film. This resin typically has an isotactic index of greater than 95%, preferably 98%, as measured by $C^{13}$ NMR isotactic pentad ratio, and % heptane insolubles of 97% or greater, melt flow rate of nominal 2.0 g/10 minutes at 230° C., melting point of 163-167° C., a crystallization temperature of about 108-126° C., a heat of fusion of about 86-110 J/g, a heat of crystallization of about 105-111 J/g, and a density of about 0.91.

Without being bound by any theory, it is believed that when the mixed polyolefin resin core layer (B) comprising a resin blend of crystalline propylene and HDPE, MDPE, LDPE or LLDPE is biaxially oriented, particularly during the transverse orientation process, incompatibility between the high density polyethylene (or medium density or low density polyethylene or linear low density polyethylene) and polypropylene domains in the film matrix in the core layer (B) causes discrete domains in the core layer (B) that affect the uniformity of the layer interface between the core layer (B) and adjacent layers, thus imparting the matte appearance of the film. This effect is amplified when higher stretching rates are used in the film making process. What is surprisingly found, however, is that these non-uniformities do not significantly increase light scattering, so that the matte appearance can be obtained without a significant increase in film haze. Also surprisingly found is that the these non-uniformities do not cause increase in the coefficient of friction of the matte surface of the film, as commonly observed on traditional matte films. Also surprisingly found is that these non-uniformities do not cause decrease in the mechanical properties of the matte film. In fact, matte film with superior mechanical properties was produced in many cases as detailed in the examples and Table 1.

Suitable grades of the HDPE resin added in the core layer (B) in order to impart this matte effect on the skin layers are such as Total HDPE 9658 high density polyethylene homopolymer, density 0.958 g/cc, MI 0.64 g/10 min, Chevron HDPE 9656 high density polyethylene homopolymer, density 0.956 g/cc, MI 0.75 g/10 min and Chevron HDPE 9649 high density polyethylene homopolymer, density 0.949 g/cc, MI 0.29 g/10 min.

Suitable grades of the MDPE resin added in the core layer (B) in order to impart this matte effect on the skin layers are such as Total MDPE M2710 medium density polyethylene homopolymer, density 0.927 g/cc, MI 0.90 g/10 min, melting point 250 F and Total MDPE M3410 medium density polyethylene homopolymer, density 0.934 g/cc, MI 0.90 g/10 min, melting point 255 F.

Suitable grades of the LDPE resin added in the core layer (B) in order to impart this matte effect on the skin layers are such as ExxonMobil LDPE 105.30 low density polyethylene homopolymer, density 0.923 g/cc, MI 2.0 g/10 min, peak melting temperature 232 F.

Suitable grades of the LLDPE resin added in the core layer (B) in order to impart this matte effect on the skin layers are such as Braskem LLDPE SLL218 linear low density polyethylene homopolymer, density 0.917 g/cc, MI 2.0 g/10 min.

The core layer (B) can also include an amount of hydrocarbon resin additive to further improve stiffness and provide some moisture barrier improvement. A preferred embodiment combines an amount of the hydrocarbon resin with a high crystalline propylene homopolymer, to produce a satisfactorily stiff BOPP film that is roughly 10% higher modulus and stiffness than an equivalent film made with a conventional crystallinity propylene homopolymer alone. The hydrocarbon resin also acts as a processing aid during biaxial orientation of the film by allowing a wider processing window in terms of stretching temperatures and motor torques for machine direction (MD) and particularly, transverse direction (TD) stretching, particularly when using a high crystalline propylene homopolymer. A suitable hydrocarbon resin is of the polydicyclopentadiene type available in masterbatch form from ExxonMobil as PA609A or PA610A, which are 50 wt % masterbatches of polypropylene carrier resin and 50 wt % polydicyclopentadiene. Suitable amounts of hydrocarbon masterbatch are concentrations of up to 20 wt % of the core layer (B) (i.e. up to 10 wt % active hydrocarbon resin component). Preferably, 20 wt % of the hydrocarbon resin masterbatch is used in conjunction with the high crystalline propylene homopolymer.

The core resin layer (B) can be surface treated on one side with an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide gases—to the exclusion of oxygen gas—is particularly preferred. This method results in a treated surface that comprises nitrogen-bearing functional groups, preferably at least 0.3 atomic % or more, and more preferably, at least 0.5 atomic % or more. This treated core layer (B) is then well suited for subsequent purposes of metallizing, printing, coating, or laminating.

In this embodiment of a 2-layer laminate film, it is often desirable to add an optional amount of antiblocking agent to the core layer (B) for aiding machinability and winding. An amount of an inorganic antiblock agent can be added in the amount of 100-1000 ppm of the core resin layer (B), preferably 300-600 ppm. Preferred types of antiblock are spherical sodium aluminum calcium silicates or an amorphous silica of nominal 3 μm average particle diameter, but other suitable spherical inorganic antiblocks can be used including crosslinked silicone polymer or polymethylmethacrylate, and ranging in size from 2 μm to 6 μm. Migratory slip agents such as fatty amides and/or silicone oils can also be optionally employed in the core layer (B) either with or without the inorganic antiblocking additives to aid further with controlling coefficient of friction and web handling issues. Suitable types of fatty amides are those such as stearamide or erucamide and similar types, in amounts of 100-1000 ppm of the core. Preferably, stearamide is used at 400-600 ppm of the core layer (B). Suitable silicone oil that can be used is a low molecular weight oil of 350 centistokes which blooms to the surface readily at a loading of 400-600 ppm of the core layer (B). However, if the matte films of this invention are desired to be used for metallizing or high definition process printing, it is recommended that the use of migratory slip additives be avoided in order to maintain metallized barrier properties and adhesion or to maintain high printing quality in terms of ink adhesion and reduced ink dot gain.

The sealable skin layer (C) is comprised substantially of a random propylene ethylene butene terpolymer, Sumitomo PP SPX78R6, density 0.90 g/cc, MF 9.5 g/10 min, including an amount of Momentive Tospearl® 120 nominal 2.0 μm spherical crosslinked silicone polymer antiblock of about 4000 ppm loading. Migratory slip agents such as fatty amides or silicone oils can also be optionally added to the sealable skin layer (C) of types and quantities mentioned previously if lower COF is desired. However, if the matte films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

The sealable resin blend layer (C) can be coextruded on one side of the core layer, said layer having a thickness after biaxial orientation of between 0.1 and 5 μm, preferably between 0.5 and 3 μm, and more preferably between 1.0 and 2.0 μm. The core layer (B) thickness can be of any desired thickness after biaxial orientation, but preferred and useful thicknesses are in the range of 8 μm to 100 μm, preferably 10 μm to 50 μm, and even more preferably 15 μm–30 μm. The coextrusion process includes a multi-layered compositing die, such as a two-, three-, or four-layer die. In the case of a 2-layer coextruded film, a two-layer compositing die can be used. In the case of a 3-layer coextruded film, the polymer core layer (B) can be sandwiched between the sealable resin layer (C) and a third layer (A) using a three-layer compositing die. One embodiment is to coextrude in only two layers with only the core layer (B) and the sealable layer (C) coextruded on one side of the core layer (B). In this case, the core layer (B) side opposite the sealable layer (C) can be further modified by adding inorganic antiblock particles into the core layer (B) itself and can also be surface-treated via a discharge-treatment method if so desired. In a three-layer coextruded film embodiment, this third layer (A) on the side of the core layer opposite the sealable layer (A) can also be modified with antiblock particles in lieu of the core layer (B) and also be surface-treated via a discharge-treatment method as desired. Selection of the said third layer (A) can be any polymer typically compatible with the core layer (B) such as propylene homopolymer or copolymers with ethylene and/or butene, or blends thereof. Typically, selection of this third layer (A) is to enhance the coextruded film's printability, appearance, metallizability, winding, laminating, sealability, or other useful characteristics. Useful thickness of this third layer (A) after biaxial orientation can be similar to the thicknesses cited for the sealable skin layer.

This third layer (A) can be comprised substantially of a mini-random crystalline polypropylene homopolymer, such as Total PP 3374HA, density 0.90 g/cc, MF 3.5 g/10 min, with an amount of Mizusawa Silton® JC-30 nominal 3.0 μm spherical sodium calcium aluminum silicate antiblock of about 300 ppm loading. The skin layer (A)—which can be used as a metal receiving layer or print receiving layer—is comprised substantially of Total PP 3374HA. Optionally, this layer can also include an amount of antiblock or antiblock masterbatch to aid in web handling.

Typical amounts of inorganic antiblock can be up to 1000 ppm of the metal receiving layer (A) (preferably, 300-600 ppm) and can comprise of silicas, amorphous sodium calcium aluminum silicates, PMMA, or crosslinked silicone polymer of nominal 1.0-6.0 μm particle size, preferably 2.0-3.0 μm particle size.

The surface opposite the sealable layer (C) can be surface-treated if desired with either a corona-discharge method, flame treatment, atmospheric plasma, or corona discharge in a controlled atmosphere of nitrogen, carbon dioxide, or a mixture thereof which excludes oxygen. The latter treatment method in a mixture of $CO_2$ and $N_2$ is preferred. This method of discharge treatment results in a treated surface that comprises nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized.

If a three-layer coextruded film embodiment is chosen, said third layer (A) may be coextruded with the core layer (B) opposite the sealable layer (C), having a thickness after biaxial orientation between 0.5 and 5 μm, preferably between 0.5 and 3 μm, and more preferably between 0.5 and 1.0 μm. This third layer (A) may contain an anti-blocking agent and/or slip additives for good machinability and a low coefficient of friction in about 0.05-0.5% by weight of the third layer. Preferably, non-migratory slip and antiblock additives should be used to maintain gas barrier properties and metal adhesion if metallizing, or ink wetting and ink adhesion if printing.

Optionally, as a basefilm for metallization, the rolls can be placed inside a vacuum chamber metallizer for vapor deposition metallization using aluminum which is well known in the art. Aluminum deposition is to be made on the surface of the skin layer A comprised of Total 3374HA. The film was then passes into the high vacuum deposition chamber of the metallizer which is metallized using aluminum to a nominal optical density target of 2.4. Optical densities for aluminum deposition can range from 2.0 to 5.0; preferably the OD range is 2.2-3.2. The metallized rolls is then slit on a film slitter and tested for properties.

One of the surprising findings of this invention was that these core layer blends of PE/PP from 0 wt % HDPE up to 80 wt % HDPE could be tentered and formed into films using standard OPP processing conditions without having to adjust conditions to compensate for the increasingly higher loadings of the lower melting point HDPE component in the core layer. No loss of film-making stability was encountered until the core layer blend approached 90 wt % HDPE and 10 wt % crystalline PP. It should be noted that this is important as the die design for the coextruded film structure was a "reduced skin" die design. This is known in the art as a die design whereby the coextruded skin layers (layers A and C, respectively of the invention) are narrower in width than the core layer B. This is done in order that the tenter chain clips—which are heated to high temperature due to its exposure within the tentering oven—grasp the exposed core layer rather than the coextruded skin layers. The reason for this is that in many multi-layer OPP film designs, a low melting point copolymer or terpolymer is often used as one of the skin layers (in this invention, layer C), and if this copolymer layer is grasped by the heated clips, the layer would melt and stick to said clips, resulting in film breaks and process instability. (A low melting point co- or terpolymer skin layer is often used to impart heat sealability properties to the OPP film.) Thus, the higher melting point exposed core layer—comprised typically of mostly crystalline polypropylene—is more thermally stable and releases from the heated clip jaws without sticking, enabling break-free and stable production of OPP films. The inventors were surprised that biaxially oriented films could be made with good stability when the core layer was blended with up to 80 wt % HDPE (and 20 wt % PP) without changing tenter conditions to lower temperatures to accommodate the higher percentage of lower melting point HDPE.

Test Methods

The various properties in the examples were measured by the following methods:

A) Haze is the percent of transmitted light that is scattered more than 2.5° from the direction of the incident beam and was measured of 1 sheet of film substantially in accordance with ASTM D1003. Materials with haze values greater than 30% are considered diffusing.

B) Gloss of the film was measured by measuring the desired side of a single sheet of film via a surface reflectivity gloss meter (BYK Gardner Micro-Gloss) substantially in accordance with ASTM D2457. The C-side or sealant layer side was measured at a 20° angle.

C) Light transmission of the film was measured by measuring light transmission of a single sheet of film via a light transmission meter (BYK Gardner Haze-Gard Plus) substantially in accordance with ASTM D1003.

D) Tensile properties such as Young's modulus, ultimate strength, and elongation are measured substantially in accordance with ASTM D882.

E) Heat seal strength was measured by using a Sentinel sealer model 12 ASL at 20 psi, 0.5 second dwell time, with heated flat upper seal jaw Teflon coated, and unheated lower seal jaw, rubber with glass-cloth covered. The film sample is heat-sealed sealable-side to sealable-side at various desired seal temperatures in the Sentinel sealer (e.g. 240° F. or 115° C.) or at desired temperature increments (e.g. 10° F. or 5.56° C. increments) from 190° F. (65.56° C.) to 290° F. (143.3° C.) and then the respective seal strengths are measured using an Instron model 4201 tensile tester. The heat-sealed film samples are cut into 1-inch wide strips, the two unsealed tails placed in the upper and lower Instron clamps, and the sealed tail supported at a 90° angle to the two unsealed tails for a 90° T-peel test. The peak and average seal strength is recorded. The preferred peak value is minimum 100 On or more at 115° C. (240° F.) seal temperature.

EXAMPLES

This invention will be better understood with reference to the following Examples, which are intended to illustrate specific embodiments within the overall scope of the invention.

Example 1

A 3-layer BOPP film was made using a 1.5 m wide pilot line sequential orientation process with a film structure consisting of: a core layer (B) consisting of a blend of about 10 wt % Total 9658 HDPE and 90 wt % Conoco Phillips PP CH020XK crystalline polypropylene of the total weight of the core layer (B); a skin layer (A) consisting of Total PP 3374HA mini-random crystalline propylene homopolymer with an amount of Mizusawa Silton® JC-30 nominal 3.0 μm spherical sodium calcium aluminum silicate antiblock of about 300 ppm loading on one side of the core layer (B); and a heat sealable layer (C) consisting of Sumitomo SPX78R6 with an amount of Momentive Tospearl® 120 nominal 2.0 μm spherical crosslinked silicone polymer antiblock of about 4000 ppm loading on the side of the core layer (B) opposite the skin layer (A) via coextrusion through a die, cast on a chill drum using an air knife pinner, oriented in the machine direction at about 4.75 times through a series of heated and differentially sped rolls, followed by transverse direction stretching in a tenter oven of about 8-10 times.

The multilayer coextruded laminate sheet was coextruded at processing temperatures of ca. 220° C. to 250° C. through a die and cast onto a cooling drum whose surface temperature was controlled between 21° C. and 38° C. to solidify the non-oriented laminate sheet at a casting speed of about 8-13 mpm. The non-oriented laminate sheet was preheated in the machine direction orienter at about 93° C. to 113° C., stretched in the longitudinal direction at about 105° C. to 113° C. at a stretching ratio of about 4.75 times the original length and the resulting stretched sheet was annealed at about 24° C. to 80° C. to reduce heat shrinkage and to obtain a uniaxially oriented laminate sheet. The uniaxially oriented laminate sheet was introduced into a tenter at a line speed of ca. 24 to 40 mpm and preliminarily heated between about 145° C. and 165° C., and stretched in the transverse direction at about 145° C. to 165° C. at a stretching ratio of about 8 times the original width and then heat-set or annealed at about 145° C. to 165° C. to reduce internal stresses due to the orientation and minimize shrinkage and give a relatively thermally stable biaxially oriented sheet.

After biaxial orientation, the thickness of the coextruded film overall was nominal 70 G (17.5 μm); the sealant layer (C) was nominal 8 G (2.0 μm); the skin layer (A) was nominal 4 G (1.0 μm); and the core layer was nominal 58 G (14.5 μm). Main layer extruder output was adjusted to maintain finished film thickness of 70 G (17.5 μm) after orientation as needed. The film was heat-set or annealed in the final zone of the tenter oven to reduce internal stresses and minimize heat shrinkage of the film and maintain a dimensionally stable biaxially oriented film. The side of the skin layer A on the core layer opposite the sealable skin layer was treated via corona discharge treatment method after orientation. The BOPP multi-layer film was wound in roll form.

Example 2

Example 1 was repeated except that the core layer (B) blend was changed to: 20 wt % Total HDPE 9658 and 80 wt % Conoco Phillips PP CH020XK.

Example 3

Example 1 was repeated except that the core layer (B) composition was changed to 30 wt % Total HDPE 9658 and 70 wt % Conoco Phillips PP CH020XK.

Example 4

Example 1 was repeated except that the core layer (B) composition was changed to 10 wt % Chevron HDPE 9656 and 90 wt % Conoco Phillips PP CH020XK.

Example 5

Example 1 was repeated except that the core layer (B) composition was changed to 20 wt % Chevron HDPE 9656 and 80 wt % Conoco Phillips PP CH020XK.

Example 6

Example 1 was repeated except that the core layer (B) composition was changed to 30 wt % Chevron HDPE 9656 and 70 wt % Conoco Phillips PP CH020XK.

Example 7

Example 1 was repeated except that the core layer (B) composition was changed to 10 wt % Chevron HDPE 9649 and 90 wt % Conoco Phillips PP CH020XK.

Example 8

Example 1 was repeated except that the core layer (B) composition was changed to 20 wt % Chevron HDPE 9649 and 80 wt % Conoco Phillips PP CH020XK.

Example 9

Example 1 was repeated except that the core layer (B) composition was changed to 30 wt % Chevron HDPE 9649 and 70 wt % Conoco Phillips PP CH020XK.

Example 10

Example 1 was repeated except that the core layer (B) composition was changed to 10 wt % Total MDPE M2710 and 90 wt % Conoco Phillips PP CH020XK.

Example 11

Example 1 was repeated except that the core layer (B) composition was changed to 20 wt % Total MDPE M2710 and 80 wt % Conoco Phillips PP CH020XK.

Example 12

Example 1 was repeated except that the core layer (B) composition was changed to 30 wt % Total MDPE M2710 and 70 wt % Conoco Phillips PP CH020XK.

Example 13

Example 1 was repeated except that the core layer (B) composition was changed to 10 wt % Total MDPE M3410 and 90 wt % Conoco Phillips PP CH020XK.

Example 14

Example 1 was repeated except that the core layer (B) composition was changed to 20 wt % Total MDPE M3410 and 80 wt % Conoco Phillips PP CH020XK.

Example 15

Example 1 was repeated except that the core layer (B) composition was changed to 30 wt % Total MDPE M3410 and 70 wt % Conoco Phillips PP CH020XK.

Example 16

Example 1 was repeated except that the core layer (B) composition was changed to 20 wt % ExxonMobil LDPE 105.30 and 80 wt % Conoco Phillips PP CH020XK.

Example 17

Example 1 was repeated except that the core layer (B) composition was changed to 30 wt % ExxonMobil LDPE 105.30 and 70 wt % Conoco Phillips PP CH020XK.

Example 18

Example 1 was repeated except that the core layer (B) composition was changed to 10 wt % Braskem LLDPE SLL218 and 90 wt % Conoco Phillips PP CH020XK.

Example 19

Example 1 was repeated except that the core layer (B) composition was changed to 20 wt % Braskem LLDPE SLL218 and 80 wt % Conoco Phillips PP CH020XK.

Example 20

Example 1 was repeated except that the core layer (B) composition was changed to 30 wt % Braskem LLDPE SLL218 and 70 wt % Conoco Phillips PP CH020XK.

Comparative Example 1

Example 1 was repeated except that the core layer (B) composition was changed to 100 wt % Conoco Phillips PP CH020XK. This is a typical BOPP low haze, high gloss non-matte film, with no PE resin added to the core.

Comparative Example 2

Example 1 was repeated except that the skin layer (A) composition was changed to 79 wt % Total 3374HA polypropylene and 21 wt % Total 8473 random propylene ethylene copolymer, density 0.90 g/cc, MF 4.6 g/10 min, melting point 273 F; the core layer (B) composition was changed to 100 wt % Conoco Phillips CH020XK; and the skin layer (C) composition was changed to 56 wt % of matte compound ASchulman Polybatch 3636 DUL LT X3, density 0.932 g/cc, MF 1.8 g/10 min, 35 wt % ExxonMobil Vistamaxx 3980 random propylene ethylene elastomer, density 0.878 g/cc, MF 8.0 g/10 min, 9 wt % total 8473 random propylene ethylene copolymer, density 0.90 g/cc, MF 4.6 g/10 min, melting point 273 F, with an amount of nominal 3.0 μm spherical crosslinked silicone polymer antiblock of about 3000 ppm loading, an amount of nominal 4.5 μm spherical crosslinked silicone polymer antiblock of about 1500 ppm loading and an amount of erucamide of about 3000 ppm loading. This is a typical BOPP high haze, low gloss matte-sealable film, with no PE resin added to the core.

Example 21

A 3-layer BOPP film was made using a 6.0 m wide production line sequential orientation process with a film structure consisting of: a core layer (B) consisting of a blend of 5 wt % Total HDPE 9658 and 95 wt % Conoco Phillips PP CH020XK of the core layer; a skin layer (A) consisting of Total PP 3374HA mini-random crystalline propylene homopolymer with an amount of Mizusawa Silton® JC-30 nominal 3.0 μm spherical sodium calcium aluminum silicate antiblock of about 300 ppm loading on one side of the core layer (B); and a heat sealable layer (C) consisting of Sumitomo PP SPX78R6 with an amount of Momentive Tospearl® 120 nominal 2.0 μm spherical crosslinked silicone polymer antiblock of about 4000 ppm loading on the side of the core layer (B) opposite the skin layer (A) via coextrusion through a die, cast on a chill drum using an air knife pinner, oriented in the machine direction at about 4.75 times through a series of heated and differentially sped rolls, followed by transverse direction stretching in a tenter oven of about 8-10 times.

The multilayer coextruded laminate sheet was coextruded at processing temperatures of ca. 220° C. to 250° C. through a die and cast onto a cooling drum whose surface temperature was controlled between 16° C. and 38° C. to solidify the non-oriented laminate sheet at a casting speed of about 55-65 mpm. The non-oriented laminate sheet was preheated in the machine direction orienter at about 156° C., stretched in the longitudinal direction at about 132° C. at a stretching ratio of about 4.70 times the original length and the resulting stretched sheet was annealed at about 18° C. to 24° C. to reduce heat shrinkage and to obtain a uniaxially oriented laminate sheet. The uniaxially oriented laminate sheet was introduced into a tenter at a line speed of ca. 250 to 310 mpm and preliminarily heated between about 178° C. and 192° C., and stretched in the transverse direction at about 161° C. to 180° C. at a stretching ratio of about 8 to 10 times the original width and then heat-set or annealed at about 155° C. to 165° C. to reduce internal stresses due to the orientation and minimize shrinkage and give a relatively thermally stable biaxially oriented sheet.

After biaxial orientation, the thickness of the coextruded film overall was nominal 70 G (17.5 μm); the sealant layer (C) was nominal 5 G (1.25 μm); the skin layer (A) was nominal 4 G (1.0 μm); and the core layer was nominal 61 G (15.25 μm). Main layer extruder output was adjusted to maintain finished film thickness of 70 G (17.5 μm) after orientation as needed. The film was heat-set or annealed in the final zone of the tenter oven to reduce internal stresses and minimize heat shrinkage of the film and maintain a dimensionally stable biaxially oriented film. The side of the skin layer (A) on the core layer opposite the sealable skin layer (C) was treated via corona discharge-treated surface formed in an atmosphere of $CO_2$ and $N_2$ to the exclusion of $O_2$ after orientation. The BOPP multi-layer film was wound in roll form.

Example 22

Example 21 was repeated except that the core layer (B) blend was changed to: 10 wt % Total HDPE 9658 and 90 wt % Conoco Phillips PP CH020XK.

Example 23

Example 21 was repeated except that the core layer (B) composition was changed to 20 wt % Total HDPE 9658 and 80 wt % Conoco Phillips PP CH020XK.

Comparative Example 3

Example 21 was repeated except that the core layer (B) composition was changed to 100 wt % Conoco Phillips PP CH020XK. This is a typical BOPP low haze, high gloss non-matte film, with no PE resin added to the core.

The BOPP films were then tested for haze, gloss, coefficient of friction and mechanical properties.

The following Table 1 illustrates the properties of these examples:

into a high gloss/low haze combination of optical properties; a traditional hazy matte film will have a Gloss/Haze ratio below 0.25, which translates into a low gloss/high haze combination of optical properties; the novel low haze matte films disclosed in this invention will have a Gloss/Haze ratio between 0.25 and 15, which translates into a low gloss/low haze combination of optical properties.

Comparative examples in Table 1 are considered to be conventional matte films.

As Table 1 shows, Comparative Example 1 (CEx 1), which is a control film of a biaxially oriented clear PP film made on a 1.5 m pilot sequential orientation line showed low haze and high gloss.

Comparative Example 2 (CEx 2), which is a control film of a biaxially oriented conventional matte OPP film using commercially available matte resin in skin layer (C) showed high haze and low gloss.

Examples 1, 2 and 3 (Ex 1, Ex 2 and Ex 3) added 10 wt %, 20 wt % and 30 wt % respectively of Total 9658 high density polyethylene to the core layer (B). The film haze value did not change much compared to control clear film, but the gloss values were much lower than the CEx 1. Although these Examples do not have as low gloss as the low gloss property of the control matte film CEx 2, the haze of these Example films are significantly lower than the control matte film CEx 2. Coefficient of friction values were

TABLE 1

| Example | Haze % | Gloss GU | Gloss/Haze GU/% | Coefficient of friction μs/μd | Ultimate Strength MD/TD kpsi | Average max puncture load kgf | Avg. puncture energy @50% Strain kgf · mm | Heat Seal Strength @ 240 F. g/in |
|---|---|---|---|---|---|---|---|---|
| Cex. 1 - BOPP clear film | 3 | 54.3 | 18.1 | 0.448/0.295 | 22/37 | 2 | 7.3 | 304 |
| Cex. 2 - BOPP conventional matte film | 46 | 8 | 0.17 | 0.559/0.424 | 22/32 | 2.1 | 6.5 | 159 |
| Ex. 1 - 10% Total HDPE 9658 | 4 | 39.3 | 9.83 | 0.424/0.255 | 23/40 | 2.4 | 10 | 347 |
| Ex. 2 - 20% Total HDPE 9658 | 4 | 31 | 7.75 | 0.284/0.186 | 22/37 | 2.1 | 8.5 | 358 |
| Ex. 3 - 30% Total HDPE 9658 | 4 | 29 | 7.25 | 0.450/0.286 | 22/32 | 1.9 | 6.7 | 375 |
| Ex. 4 - 10% Chevron HDPE 9656 | 7.5 | 16 | 2.13 | 0.415/0.259 | 24/41 | 2.7 | 15.4 | 292 |
| Ex. 5 - 20% Chevron HDPE 9656 | 7.1 | 17.7 | 2.49 | 0.406/0.256 | 23/34 | 2.5 | 12.7 | 220 |
| Ex. 6 - 30% Chevron HDPE 9656 | 11.3 | 14 | 1.24 | 0.443/0.282 | 21/29 | 1.9 | 5.9 | 252 |
| Ex. 7 - 10% Chevron HDPE HF006 | 13.6 | 10 | 0.74 | 0.415/0.276 | 22/34 | 2.3 | 7.6 | 189 |
| Ex. 8 - 20% Chevron HDPE HF006 | 11.7 | 11 | 0.94 | 0.407/0.260 | 22/36 | 2.2 | 7.8 | 180 |
| Ex. 9 - 30% Chevron HDPE HF006 | 14.1 | 9 | 0.64 | 0.500/0.305 | 19/28 | 1.8 | 5.8 | 157 |
| Ex. 10 - 10% Total MDPE M2710 | 6.5 | 22 | 3.38 | 0.442/0.248 | 25/34 | 2.4 | 7.8 | 270 |
| Ex. 11 - 20% Total MDPE M2710 | 8.7 | 19 | 2.18 | 0.450/0.247 | 24/32 | 1.9 | 6.1 | 268 |
| Ex. 12 - 30% Total MDPE M2710 | 10.6 | 19.3 | 1.82 | 0.432/0.282 | 23/26 | 1.6 | 4.7 | 337 |
| Ex. 13 - 10% Total MDPE M3410 | 7.7 | 28 | 3.64 | 0.407/0.244 | 23/38 | 2.4 | 7.8 | 287 |
| Ex. 14 - 20% Total MDPE M3410 | 8.3 | 21 | 2.53 | 0.430/0.257 | 23/30 | 1.8 | 5.4 | 282 |
| Ex. 15 - 30% Total MDPE M3410 | 11.6 | 19 | 1.64 | 0.465/0.283 | 23/26 | 1.6 | 4.4 | 319 |
| Ex. 16 - 20% ExxonMobil LDPE 105.30 | 5 | 24.7 | 4.94 | 0.407/0.250 | 21/36 | 2.1 | 6.8 | 233 |
| Ex. 17 - 30% ExxonMobil LDPE 105.30 | 7 | 16.7 | 2.39 | 0.465/0.282 | 18/35 | 1.8 | 6.1 | 242 |
| Ex. 18 - 10% Braskem LLDPE SLL218 | 5.3 | 36 | 6.79 | 0.399/0.267 | 25/39 | 2.4 | 9.2 | 360 |
| Ex. 19 - 20% Braskem LLDPE SLL218 | 6.6 | 27 | 4.09 | 0.404/0.255 | 21/34 | 1.8 | 6.6 | 367 |
| Ex. 20 - 30% Braskem LLDPE SLL218 | 10.5 | 19.3 | 1.84 | 0.431/0.279 | 21/29 | 1.5 | 5.4 | 397 |
| Cex. 3 - BOPP clear film | 6 | 94 | 15.67 | 0.622/0.506 | 20/46 | 2.5 | 12.1 | 358 |
| Ex. 21 - 5% Total HDPE 9658 | 16.5 | 18 | 1.09 | 0.915/0.793 | 22/45 | 2.4 | 12.1 | 388 |
| Ex. 22 - 10% Total HDPE 9658 | 14.9 | 15.3 | 1.03 | 0.796/0.744 | 21/43 | 2.2 | 10.1 | 370 |
| Ex. 23 - 20% Total HDPE 9658 | 17.1 | 12.7 | 0.74 | 0.824/0.732 | 19/35 | 2.1 | 8.6 | 355 |

Gloss was measured on a surface of the film.

Haze was measured through the thickness of the film.

The Gloss/Haze value is the gloss to haze ratio of the film. The Gloss/Haze value is important to optically distinguish clear traditional glossy films and traditional hazy matte films to the novel low haze matte films. A clear traditional glossy film will have a Gloss/Haze ratio above 15, which translates similar or lower to control clear film CEx. 1 and substantially lower than control matte film CEx 2. Tensile properties were comparable or better than CEx 1, and puncture resistance was improved, indicating retention or improvement of mechanical properties of the BOPP film. Heat seal was comparable to control clear film and better than control matte film.

Examples 4, 5 and 6 (Ex 4, Ex 5 and Ex 5) added 10 wt %, 20 wt % and 30 wt % respectively of Chevron 9656 high density polyethylene to the core layer (B). The film haze showed slight increase over control clear film CEx 1, but was surprisingly much lower than the control matte film CEx 2, whereas the gloss values were surprisingly lower than the control clear film CEx 1, and also surprisingly comparable to the low gloss property of the control matte film CEx 2. Coefficient of friction values were similar or lower to control clear film and substantially lower than control matte film. Tensile properties were comparable or better than CEx 1, and puncture resistance was improved, indicating retention or improvement of mechanical properties of the BOPP film. Heat seal was lower than control clear film and better than control matte film.

Examples 7, 8 and 9 (Ex 7, Ex 8 and Ex 9) added 10 wt %, 20 wt % and 30 wt % respectively of Chevron 9649 high density polyethylene to the core layer (B). The film haze showed moderate increase over control clear film CEx 1, but was surprisingly much lower than the control matte film CEx 2, whereas the gloss values were surprisingly lower than the control clear film CEx 1, and also surprisingly comparable to the low gloss property of the control matte film CEx 2. Coefficient of friction values were similar or lower to control clear film and substantially lower than control matte film. Tensile properties were comparable or better than CEx 1, and puncture resistance was also comparable, indicating retention of mechanical properties of the clear BOPP film. Heat seal was lower than control clear film and better than control matte film.

Examples 10, 11 and 12 (Ex 10, Ex 11 and Ex 12) added 10 wt %, 20 wt % and 30 wt % respectively of Total M2710 medium density polyethylene to the core layer (B). The film haze showed slight increase over control clear film CEx 1, but was surprisingly much lower than the control matte film CEx 2, whereas the gloss values were surprisingly lower than the control clear film, and also surprisingly comparable to the low gloss property of the control matte film. Coefficient of friction values were similar or lower to control clear film and substantially lower than control matte film. Tensile properties, however, were comparable or worse than CEx. 1, and puncture resistance was also comparable or worse, indicating poor retention of mechanical properties of the clear BOPP film. Heat seal was lower than control clear film, but improved with higher levels of MDPE, and better than control matte film.

Examples 13, 14 and 15 (Ex 13, Ex 14 and Ex 15) added 10 wt %, 20 wt % and 30 wt % respectively of Total M3410 medium density polyethylene to the core layer (B). The film haze showed slight increase over control clear film CEx 1, but was surprisingly much lower than the control matte film CEx 2, whereas the gloss values were surprisingly lower than the control clear film, and also surprisingly comparable to the low gloss property of the control matte film. Coefficient of friction values were similar or lower to control clear film and substantially lower than control matte film. Tensile properties, however, were comparable or worse than CEx. 1, and puncture resistance was also comparable or worse, indicating poor retention of mechanical properties of the clear BOPP film. Heat seal was lower than control clear film, but improved with higher levels of MDPE, and better than control matte film.

Examples 16, 17 and 18 (Ex. 16 and Ex. 17) added 20 wt % and 30 wt % respectively of ExxonMobil 105.30 low density polyethylene to the core layer (B). The film haze showed slight increase over control clear film CEx 1, but was surprisingly much lower than the control matte film CEx 2, whereas the gloss values were surprisingly lower than the control clear film, and also surprisingly comparable to the low gloss property of the control matte film. Coefficient of friction values were similar or lower to control clear film and substantially lower than control matte film. Tensile properties, however, were comparable or worse than CEx. 1, and puncture resistance was also comparable or worse, indicating poor retention of mechanical properties of the clear BOPP film. Heat seal was lower than control clear film, but improved with higher levels of LDPE, and better than control matte film.

Examples 19, 20 and 21 (Ex. 18, Ex. 19 and Ex. 20) added 10 wt %, 20 wt % and 30 wt % respectively of Braskem SLL218 linear low density polyethylene to the core layer (B). The film haze showed slight increase over control clear film CEx 1, but was surprisingly much lower than the control matte film CEx 1, whereas the gloss values were surprisingly lower than the control clear film, and also surprisingly comparable to the low gloss property of the control matte film. Coefficient of friction values were similar or lower to control clear film and substantially lower than control matte film. Tensile properties, however, were comparable or worse than CEx. 1, and puncture resistance was also comparable or worse, indicating poor retention of mechanical properties of the clear BOPP film. Heat seal was better than control clear film and better than control matte film.

Comparative Example 3 (CEx 3), which is a control film of a biaxially oriented clear PP film made on a 6.0 meter production sequential orientation line showed low haze and very high gloss.

Examples 22, 23 and 24 (Ex. 21, Ex. 22 and Ex. 23) added 5 wt %, 10 wt % and 20 wt % respectively of Total 9658 high density polyethylene to the core layer (B); Examples 23 and 24 are similar to Examples 1 and 2, using respectively 10% and 20% HDPE in the core layer (B), but produced on a larger and faster line (6.0 m vs. 1.5 m). Although the film haze did not change much compared to control clear film CEx 3, as demonstrated by low haze values of examples 22, 23 and 24, a significant change was observed on the film gloss values, which were much lower than control CEx 3 even at 5 wt % HDPE added to the core layer. These gloss values also showed a significant drop when compared to similar films produced on a smaller and slower line, which show that higher speeds and stretching rates also contribute to a significant gloss reduction without a significant increase in haze, which would be undesired. Coefficient of friction and mechanical properties were similar to control clear film, and heat seal was better than control clear film, indicating retention or improvement of general properties of the BOPP film.

According to an embodiment disclosed herein, a multi-layer biaxially oriented film has a base or core layer, the base or core layer comprising a first polyolefin resin-containing layer, wherein the film has a gloss to haze ratio of greater than 0.25 GU/% and less than 15 GU/%.

According to an embodiment, the matte side has a gloss to haze ratio of greater than 0.5 GU/% and less than 12.5 GU/%.

According to an embodiment, the matte side has a gloss to haze ratio of greater than 1 GU/% and less than 10 GU/%.

According to an embodiment, the matte side has a gloss to haze ratio of greater than 1.5 GU/% and less than 7.5 GU/%.

According to an embodiment, the matte side has a gloss to haze ratio of greater than 2.5 GU/% and less than 6.5 GU/%.

According to an embodiment, the matte side has a gloss to haze ratio of greater than 4.5 GU/% and less than 5.5 GU/%.

According to an embodiment, the film has haze below 30% and gloss below 40 GU.

According to an embodiment, the film has haze below 25% and gloss below 35 GU.

According to an embodiment, the film has haze below 20% and gloss below 30 GU.

According to an embodiment, the film has haze below 15% and gloss below 25 GU.

According to an embodiment, the film has haze below 5% and gloss below 10 GU.

According to an embodiment, the film further comprises additional layers comprising a second polyolefin resin-containing layer, a metal layer, or combinations thereof.

According to an embodiment, the first polyolefin resin-containing layer comprises a blend of polyethylene and crystalline polypropylene.

According to an embodiment, the polyethylene comprises a high density polyethylene.

According to an embodiment, an amount of high density polyethylene is about 1-90 wt % of the core or base layer.

According to an embodiment, the polyethylene comprises a medium density polyethylene.

According to an embodiment, an amount of the medium density polyethylene is about 1-90 wt % of the core or base layer.

According to an embodiment, the polyethylene comprises a low density polyethylene.

According to an embodiment, an amount of the low density polyethylene is about 1-90 wt % of the core or base layer.

According to an embodiment, the polyethylene comprises a linear low density polyethylene.

According to an embodiment, an amount of the linear low density polyethylene is about 1-90 wt % of the core or base layer.

According to an embodiment, the film has a film thickness of about 70 G.

Also disclosed herein, according to an embodiment, is a method of manufacturing of the film disclosed herein, comprising operating a sequential manufacturing under BOPP film-making processing conditions and tentering temperatures.

Also disclosed herein, according to an embodiment, is a method of manufacturing of the film disclosed herein, comprising operating a simultaneous orientation manufacturing line under BOPP film-making processing conditions and tentering temperatures.

In conclusion, the use of different types of polyethylene blended with polypropylene in the core layer and not in the coextruded skin layers can be an effective method to obtain matte and low gloss appearance without significantly increasing film haze. Coefficient of friction values are similar to standard BOPP film, and much lower than conventional matte BOPP film. The best combination of properties is achieved when using certain grades of high density polyethylene resin, which showed that mechanical properties of the film can also be maintained adequately compared to standard BOPP film. Indeed, the use of HDPE blended with PP provide properties that are comparable to or better than standard BOPP. Surprisingly, the inventors have found that such blends can be made using up to 80 wt % HDPE in the core layer without having to change process conditions from standard BOPP conditions. Thus, an added advantage is that these HDPE/PP blends can be made into biaxially oriented films using BOPP film-making assets and at BOPP processing conditions; this improves productivity and costs of such HDPE/PP blended core layer films.

The invention claimed is:

1. A multi-layer biaxially oriented film comprising of a base or core layer and at least one adjacent layer, the base or core layer comprising a first polyolefin resin-containing layer comprising polypropylene and polyethylene, wherein the film has a matte side having gloss below 40 GU and has a gloss to haze ratio of greater than 0.25 GU/% and less than 15 GU/%, the polypropylene having an isotactic content of about 90% or greater, a melt flow rates of about 1.6-2.0 g/10 min, a heat of crystallization of about 105-111 J/g, and a $C^{13}$ NMR isotactic pentad ratio of about 93%, wherein the film has haze below 30%.

2. The film of claim 1, wherein the matte side has a gloss to haze ratio of greater than 0.5 GU/% and less than 12.5 GU/%.

3. The film of claim 1, wherein the matte side has a gloss to haze ratio of greater than 1 GU/% and less than 10 GU/%.

4. The film of claim 1, wherein the matte side has a gloss to haze ratio of greater than 1.5 GU/% and less than 7.5 GU/%.

5. The film of claim 1, wherein the film has haze below 25% and gloss below 35 GU.

6. The film of claim 1, wherein the film has haze below 20% and gloss below 30 GU.

7. The film of claim 1, wherein the film has haze below 15% and gloss below 25 GU.

8. The film of claim 1, further comprising additional layers comprising a second polyolefin resin-containing layer, a metal layer, or combinations thereof.

9. The film of claim 1, wherein the first polyolefin resin-containing layer comprises a blend of polyethylene and crystalline polypropylene.

10. The film of claim 9, wherein the polyethylene comprises a high density polyethylene.

11. The film of claim 10, wherein an amount of high density polyethylene is about 1-90 wt % of the core or base layer.

12. The film of claim 9, wherein the polyethylene comprises a medium density polyethylene.

13. The film of claim 12, wherein an amount of the medium density polyethylene is about 1-90 wt % of the core or base layer.

14. The film of claim 9, wherein the polyethylene comprises a low density polyethylene.

15. The film of claim 14, wherein an amount of the low density polyethylene is about 1-90 wt % of the core or base layer.

16. The film of claim 9, wherein the polyethylene comprises a linear low density polyethylene.

17. The film of claim 16, wherein an amount of the linear low density polyethylene is about 1-90 wt % of the core or base layer.

18. The film of claim 1, wherein the film has a film thickness of about 70 G.

19. The film of claim 1, wherein the polyethylene in an amount of 1 wt. % to 30 wt. %.

20. The film of claim 1, wherein the first polyolefin resin-containing layer contains the polyethylene in an amount of 1 wt. % to 20 wt. %.

21. A multi-layer biaxially oriented film comprising of a base or core layer and at least one adjacent layer, the base or core layer comprising a first polyolefin resin-containing layer comprising polypropylene and polyethylene, wherein the film has a matte side having gloss below 40 GU and has a gloss to hate ratio of greater than 0.25 GU/% and less than 15 GU/%, the polypropylene having an isotactic content of about 90% or greater, a melt flow rates of about 1.6-2.0 g/10 min, a heat of crystallization of about 105-111 J/g, and a C13 NMR isotactic pentad ratio of about 93%, wherein the at least one adjacent layer comprises propylene and particles of antiblock, wherein the propylene of the at least one adjacent layer comprises crystalline propylene homopolymer and the antiblock comprises silcate-containing antiblock.

* * * * *